2,870,138

ERYTHROMYCIN SALTS

Maxton F. Murray, Kalamazoo Township, Kalamazoo County, Mich., assignor to The Upjohn Company, Kalamazoo, Mich., a corporation of Michigan No Drawing. Application August 13, 1953
Serial No. 374,115

3 Claims. (Cl. 260—210)

This invention relates to chemical compounds and more particularly, to novel salts of erythromycin and to a process for the preparation thereof.

Erythromycin is an antibiotic exhibiting significant activity against Gram-positive organisms, Gram-negative organisms, and large viruses. The antibiotic is obtained by growing an erythromycin-producing strain of *Streptomyces erythreus* (NRRL 2338) on a culture medium as described in Union of South Africa Patent No. 16073 (granted March 23, 1953) and Antibiotics and Chemotherapy 2, 281–3 (1952). It has the following structural formula (Chemical and Engineering News, October 22, 1956, page 5138):

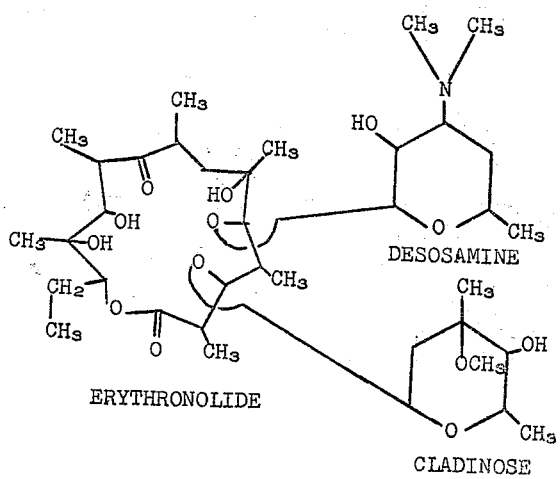

Due to its bitter taste, erythromycin possesses limited utility for oral administration. Liquid preparations containing the antibiotic have proved to be unsatisfactory since attempts to mask this unpleasant taste have been unsuccessful. Prior to this invention, therefore, oral administration of erythromycin has been limited to capsules and tablets.

It is an object of the present invention to provide novel salts of erythromycin. Another object of the invention is to provide salts of erythromycin possessing antibacterial activity corresponding to that of erythromycin. Another object of the invention is to provide erythromycin salts which are more palatable than erythromycin. A further object of the invention is to provide a method for the preparation of these novel trythromycin salts.

It has now been found that by reacting erythromycin with a member selected from the group consisting of 3-phenylsalicylic acid and 5-phenylsalicylic acid, the acid reacts with the tertiary amino group of the desosamine moiety to form the corresponding novel and therapeutically valuable erythromycin salts, i. e., erythromycin 3-phenylsalicylate and erythromycin 5-phenylsalicylate. The reaction is conducted at temperatures ranging from about minus twenty degrees centigrade to about sixty degrees centigrade and preferably between twenty and thirty degrees centigrade. The erythromycin and phenylsalicylic acid compounds react in equivalent proportions, for example, one mole of erythromycin reacts with one mole of phenylsalicylic acid to form the corresponding erythromycin phenylsalicylate. Satisfactory results are likewise obtained by reacting erythromycin with a slight excess of phenylsalicylic acid to form the corresponding erythromycin phenylsalicylate.

The preparation of the erythromycin salts by reacting erythromycin with either 3-phenylsalicylic acid or 5-phenylsalicylic acid is usually carried out in a solvent. Any inert solvent which is a solvent for one of the reactants and advantageously for both reactants, can be used. The term "inert solvent" is used herein in accordance with the second definition of "solvent" in Hackh's Chemical Dictionary, third edition, to mean "a liquid which dissolves another substance without any change in chemical composition," in contradistinction to those types of solvents which dissolve by a chemical reaction. Suitable solvents include the chlorinated hydrocarbons such as methylene chloride, chloroform, ethylene dichloride and carbon tetrachloride, and the like, and other solvents such as diethyl ether, isopropyl ether, dioxan, methyl alcohol, ethyl alcohol, isopropyl alcohol, acetonitrile, and the like, diethyl ether being the preferred solvent.

The novel erythromycin phenylsalicylates of the invention are characterized by an antibacterial spectrum similar to that exhibited by erythromycin. These salts are useful as active ingredients of stable medicaments suitable for parenteral, topical and oral administration. They are particularly valuable for use in stable, liquid, oral medicaments of improved palatability. The value of a palatable, liquid, oral erythromycin medicament cannot be overemphasized since this method of administration is not only very convenient but also well suited for administration to infants and young children incapable of swallowing tablets or capsules.

Erythromycin 3- and 5-phenylsalicylate are further characterized by their sparing solubility in water; 1.0 milligram per milliliter and 0.6 milligram per milliliter, respectively. These salts do not dissolve appreciably in saliva and consequently are more palatable than the more soluble erythromycin, i. e., 2.0 milligrams per milliliter. Surprisingly, erythromycin 4-phenylsalicylate is even more soluble (3.0 milligrams per milliliter of water) than erythromycin, and is less palatable than the isomeric erythromycin 3- and 5-phenylsalicylates. It appears that there may be a direct correlation between taste and solubility of erythromycin salts. The following table sets forth the solubility of various erythromycin salts:

TABLE I

*Solubility of erythromycin salts*

| Erythromycin salt: | Solubility in water mgm./ml. |
|---|---|
| Hydrochloride | 40 |
| Sulfate | >25 |
| Citrate | >30 |
| Mandelate | >10 |
| Oxalate | 28 |

Erythromycin 3- and 5-phenylsalicylates are superior in taste, especially the 5-isomer, to the various erythromycin salts indicated in the table above.

The following examples illustrate the products in process of the present invention but are not to be construed as limiting. The molecular weight of erythromycin is assumed to be 720.

EXAMPLE 1

Erythromycin 5-phenylsalicylate

A solution of 1.44 grams (2.0 millimoles) of erythromycin in 25 milliliters of anhydrous diethyl ether is added drop-wise, at room temperature, with stirring, and over a period of ten minutes, to a solution of 0.43 gram (2.0 millimoles) of 5-phenylsalicylic acid [Vorozhteov and Troshchenko, J. Gen. Chem. (USSR), 8 424 (1938)] in 25 milliliters of anhydrous diethyl ether. A precipitate of erythromycin 5-phenylsalicylate is immediately obtained. After stirring for an additional ten to fifteen minutes, the mixture is filtered, the erythromycin salt is washed well with ether and dried overnight at room temperature in a vacuum desiccator. A yield of 1.20 grams of erythromycin 5-phenylsalicylate is obtained melting between 180 and 181 degrees centigrade. The following elemental analysis is obtained: C, 62.14, 61.86; H, 8.09, 8.35; N, 1.78.

The optical rotation in 95 percent ethyl alcohol is $[\alpha]_D^{23}$ minus 56 degrees.

Using a paper disc-agar plate assay, with *B. subtilis* as the test organism, the following assay is obtained:

Calculated: 771 mgs. erythromycin/g. of erythromycin 5-phenylsalicylate. Found: 683 mgs./g.

EXAMPLE 2

Erythromycin 3-phenylsalicylate

Following the procedure described in Example 1 except for the substitution of 5-phenylsalicylic acid by 0.43 gram (2.0 millimoles) of 3-phenylsalicylic acid [Slotta and Nola, Ber., 68B, 2226 (1935)], 1.71 grams of erythromycin 3-phenylsalicylate (92 percent yield) is obtained melting between 147 and 150 degrees centigrade. The following elemental analysis is obtained: C, 62.07, 62.15; H, 8.14, 8.25; N, 1.90.

The optical rotation in 95 percent ethyl alcohol is $[\alpha]_D^{23}$ minus 58 degrees.

By the paper disc-agar plate assay using *B. subtilis* as the test organism, the following assay is obtained:

Calculated: 771 mgs. erythromycin/g. of erythromycin 3-phenylsalicylate. Found: 698 mgs./g.

It is to be understood that the invention is not to be limited to the exact details of operation as shown and described, as obvious modifications and equivalents will be apparent to one skilled in the art, and the invention is therefore to be limited only by the scope of the appended claims.

I claim:

1. A compound having the formula:

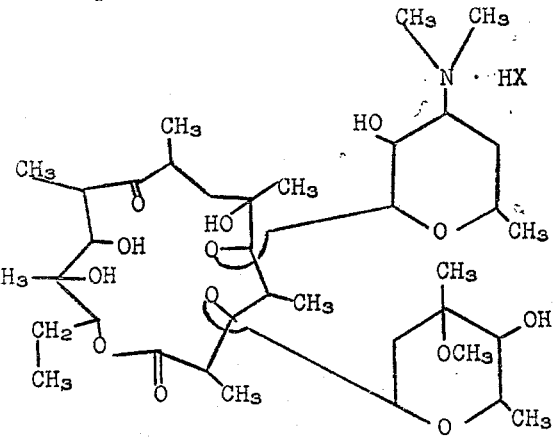

wherein HX is selected from the group consisting of 3-phenylsalicylic acid and 5-phenylsalicylic acid.

2. The compound of claim 1 in which HX is 3-phenylsalicylic acid.

3. The compound of claim 1 in which HX is 5-phenylsalicylic acid.

References Cited in the file of this patent

UNITED STATES PATENTS

| | | |
|---|---|---|
| 2,022,678 | Kritchevsky et al. | Dec. 3, 1935 |
| 2,653,899 | Bunch et al. | Sept. 29, 1953 |

OTHER REFERENCES

Frankel: Arzneimittel Synthese, page 564, pub. 1927, Berlin, by Verlag von Julius Springer.

"Bacitracin," pub. by S. B. Penick Co., 1952, pp. 22–23.

U. S Dispensatory, 23rd ed, 1943, pp. 920–921.

McGuire et al.: "Antibiotics and Chemotherapy," June 1952, vol. II, No 6, pp. 281–283.

Clark: Antibiotics and Chemotherapy, July 1953, pp. 663–671.

Hasbrouck et al.: "Antibiotics and Chemotherapy," October 1953, pp. 1040 and 1053.

Flynn et al.: J. A. C. S., June 20, 1954, pp. 3121–3125.